United States Patent
Baddour et al.

[11] Patent Number: 6,031,717
[45] Date of Patent: Feb. 29, 2000

[54] BACK FLOW LIMITING DEVICE FOR FAILED REDUNDANT PARALLEL FAN

[75] Inventors: Alfred Rafi Baddour; David L. Moss; Richard S. Mills, all of Austin, Tex.

[73] Assignee: Dell USA, L.P., Round Rock, Tex.

[21] Appl. No.: 09/290,980

[22] Filed: Apr. 13, 1999

[51] Int. Cl.[7] ..................................... G06F 1/20
[52] U.S. Cl. .................. 361/687; 361/695; 454/184; 454/353
[58] Field of Search .................. 361/687, 695; 454/184, 353

[56] References Cited

U.S. PATENT DOCUMENTS

| | | |
|---|---|---|
| 5,210,680 | 5/1993 | Scheibler . |
| 5,546,272 | 8/1996 | Moss et al. . |
| 5,572,403 | 11/1996 | Mills . |
| 5,787,971 | 8/1998 | Dodson . |
| 5,793,610 | 8/1998 | Schmitt et al. . |
| 5,890,959 | 4/1999 | Pettit et al. ............... 454/184 |

*Primary Examiner*—Leo P. Picard
*Assistant Examiner*—John D. Reed
*Attorney, Agent, or Firm*—Haynes and Boone, L.L.P.

[57] ABSTRACT

A plurality of parallel fans are mounted for moving side-by-side columns of air in a chassis. A louver member is provided adjacent each fan. Each louver member is bendable from a closed position to an open position by a flow of air generated by its respective fan, and is restrictedly bendable to a closed position, in engagement with a portion of an air passageway, in response to failure of its respective fan.

16 Claims, 6 Drawing Sheets

BACK FLOW LIMITING DEVICE FOR FAILED REDUNDANT PARALLEL FAN

BACKGROUND

The disclosures herein relate generally to computer systems and more particularly to redundant forced air cooling in a computer chassis.

Redundant forced air cooling in electronics is generally handled in one of two ways. Assuming the cooling mechanism is forced air movement, redundancy can be handled by a serial implementation of the air movers (fans) or a parallel implementation. For the parallel implementation specifically, it is common to use an "N+1" strategy; meaning that there is one more fan than is actually needed to remove heat from the enclosure. If one of the fans fails, the remaining fan or fans move sufficient enough air to cool all components within their specified limits. A disadvantage of this strategy is that if any of the fans are proximally located to critical components, and are providing an increased air velocity to maintain proper temperature, then a failure of that fan might cause specific temperature increase unless a second fan were located close enough as well. Assuming the definition of successful redundant N+1 parallel cooling, means that the failure of any one fan does not offer any proximal risk to any component, then the following additional problem exists.

In a parallel combination of fans, the failure of one fan likely causes an "air short circuit". The pressure upstream of a fan is lower than the pressure downstream of a fan. In a system where fans blow into an enclosure, the pressure in the enclosure is greater than externally. In a system where fans draw out of the enclosure, the pressure is less inside the enclosure than externally. In either case, a failed parallel fan provides an "open window" for a higher pressure air to flow back to the lower pressure space (an air short circuit). The failure of one fan therefore, instead of reducing proportionally one fan's contribution of the total air flow, could possibly reduce the total air flow by more than the contribution of one fan. Because of this, the cooling system has to be "over-designed" to take into account this backward flow or to prevent it entirely.

In the past, various attempts have been made to improve redundant cooling systems. In U.S. Pat. No. 5,210,680, a card cage is provided with an air cooling system employing deformable baffles in the air flow path to the spaces between the printed circuit cards. The baffles are deformed upon assembly in order to adapt to the thermal conditions to be expected during operation of the card cage. The baffles provide minimum openings which produce a pressure in front of the openings which effects a more uniform flow distribution via the openings, and which also permits an increase in the air flow rate to the printed circuit cards which are subject to strong thermal stresses.

U.S. Pat. No. 5,572,403 discloses a cooling subsystem and method, for a chassis of a computer system. The cooling subsystem comprises: (1) first and second cooling fans having first and second motors for driving the first and second cooling fans, respectively, and (2) a common plenum substantially shrouding and providing a pathway for air communication between the first and second cooling fans. The first and second fans cooperate to provide an optimum rate of air flow from without the chassis to within the chassis to provide air exchange within the chassis. The air flow within the chassis is in a predetermined direction to provide directed cooling of a specified device within the chassis. The common plenum allows the first and second fans to continue to cooperate to provide a minimum air flow and air exchange within the chassis. The air flow remains in the predetermined direction to continue the directed cooling of the specified device when one of the first and second motors fails. The plenum comprises a bypass aperture for allowing the air to alternatively enter and exit the plenum. The bypass aperture increases a rate of air flow across the subsystem when one of the motors fails.

U.S. Pat. No. 5,793,610 discloses a cooling fan system for a chassis configured to contain heat generating electrical components and to assume horizontal and vertical alternative operating orientations. The cooling fan system includes a support member within the chassis and having an air flow opening formed therein. Additionally, the cooling fan system includes a louver member attached to the support member to rotate between an open position, wherein a substantial air flow is allowed through the air flow opening, and a closed position wherein the louver member covers the air flow opening. The louver member may be made from plastic, however, other types of rigid materials that can withstand the chassis' operating conditions could also be used, such as metal. The axis of rotation of the louver member is oriented with respect to the chassis to allow gravity to urge the louver member toward the closed position when the chassis is positioned in either the horizontal or vertical operating orientations, to prevent a back-flow of air in the chassis.

The diagonal nature of the plate mountings permits the device to work in the "tower" mode or the "rack" mode, i.e. within these two 90° extremes. During normal (non-failed) operation, each fan's airflow is impeded and has to overcome the weight of the rigid louvers in order to keep the passageways open for airflow. Thus, the weight of the plastic louver acts against the airflow.

In U.S. Pat. No. 5,787,971, a cooling device for an electrical component, such as a computer processor, includes a heat sink and a plurality of fans. The fans are redundant in that sufficient cooling is supplied should one fan fail. The fans are independently replaceable in situ without power loss to the other fan or the processor. The heat sink includes a base plate having a bottom for surface contact with the processor, a front row of fins projecting upward from the front of the base plate and a rear row of fins projecting upward from the rear of the base plate. A plurality of fans are mounted within a cavity between fan rows. Each fan blows a flow of air such that the flow impinges on the base plate. A central channel between the front and rear fin rows provides a path for air such that should one fan fail, the other fans remain operable for generating a flow of air that impinges on the top surface beneath the failed fan for cooling.

Therefore, what is needed is a back flow limiting apparatus for a failed fan in a parallel redundant fan cooling system which is economical, easy to install and/or replace, and non-complex.

SUMMARY

One embodiment, accordingly, provides a passive check valve used to permit flow when a respective fan is operational and to impede flow when the respective fan fails. To this end, a flow limiting apparatus includes a flexible louver member and a plurality of separately movable flaps formed with the flexible member. A portion of the flexible member provides a common interconnection for the flaps.

A principal advantage of this embodiment is that the louver member is an inexpensive, thin sheet of polymer which is cut to form flexible flaps which are bendable in response to air flow thereacross. The louver member is easily installed and/or replaced and functions as a passive one-way check valve to limit an air short circuit when one of a plurality of parallel cooling fans fails in a contained cooling system.

DETAILED DESCRIPTION

Figure 1:
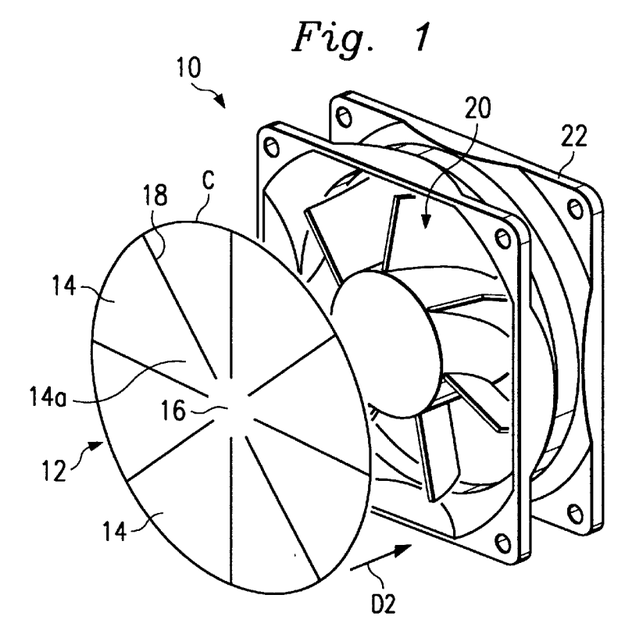
FIG. 1 is an isometric view illustrating an embodiment of an inoperative fan and an adjacent louver member.
Figure 2:
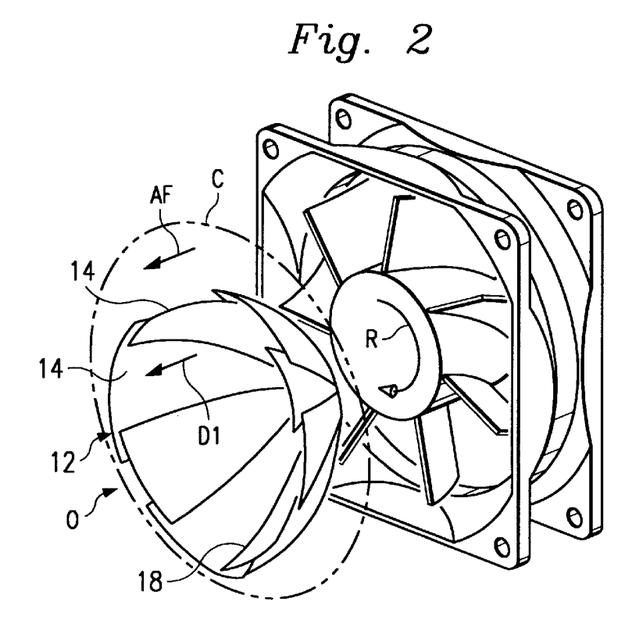
FIG. 2 an isometric view illustrating an embodiment of an operating fan and an adjacent louver member.

A flow limiting apparatus is generally designated 10 in FIG. 1 and comprises a louver member 12 including a plurality of radially outwardly extending, separately movable leaflets or flaps 14 joined at a common interconnection or hub 16. Flaps 14 are deformed by being bendable adjacent the hub 16 between an open position "O", FIG. 2, and a closed position "C", FIG. 1. Flaps 14, FIGS. 1 and 2, are formed by radial cuts 18 formed in member 12 which is preferably formed of a thin disk of polymer material. The radial cuts 18 permit the flaps 14 to overlap when louver member 12 is in the open position "O". It is to be understood that various structural configurations will provide the desired result of flexible flaps 14 joined at interconnection 16. For example, flaps 14 may extend radially inwardly or may extend either vertically or horizontally. In any configuration however, the flaps 14 are separately movable and joined at a common interconnection.

The disclosed structure permits bending or flexing of flaps 14 in a region 14a FIG. 1, adjacent hub 16 in response to air flow acting on louver member 12. Such air flow may be generated by a fan 20 rotating in a direction designated R, FIG. 2, mounted in a fan housing 22 adjacent louver member 12. Air flow is generated by fan 20 in a direction designated AF, which flexes flaps 14 in a first direction D1. When no air flow AF is generated by fan 20, FIG. 1, such as when fan 20 fails, flaps 14 return to their natural or at rest state by moving in a second direction D2, opposite direction D1.

Figures 3, 4:
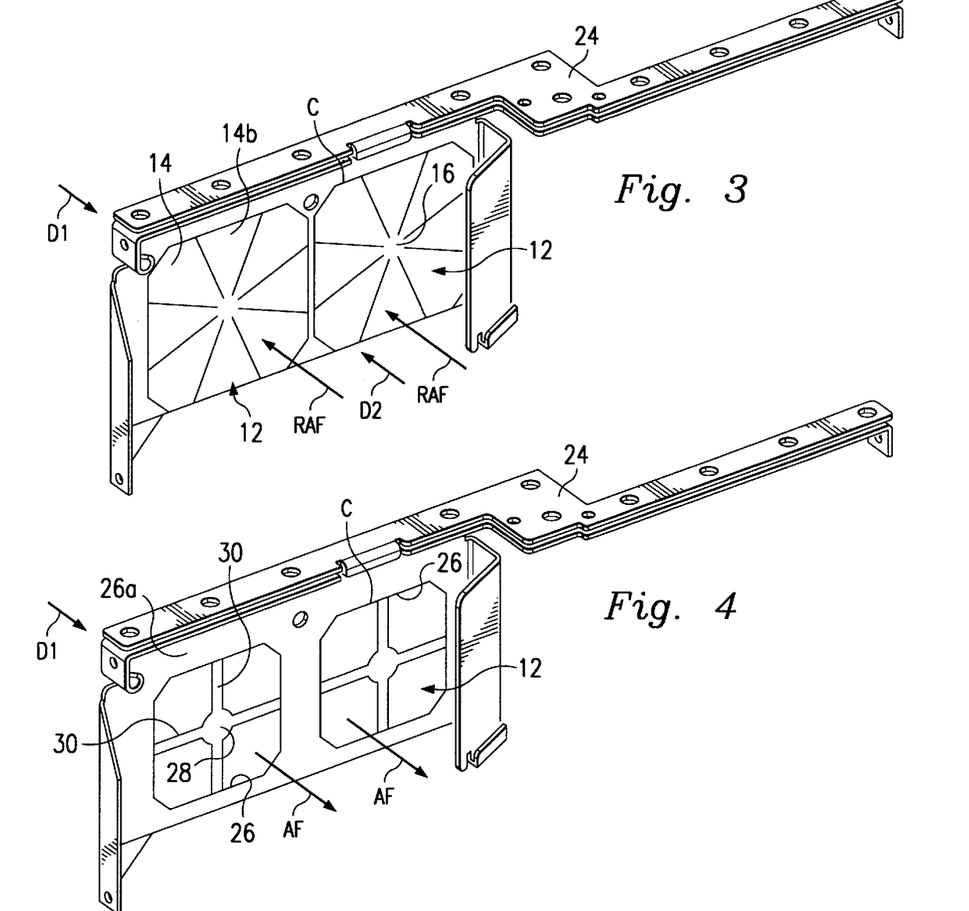
FIG. 3 is an isometric view illustrating an embodiment of a frame portion of a computer chassis supporting side-by-side louver members.
FIG. 4 is an isometric view illustrating an embodiment of a frame portion of a computer chassis including side-by-side openings.

Although louver member 12 can be mounted on housing 22, it is preferably mounted on a frame member 24, adjacent an opening 26, formed therein, FIG. 4. Preferably, a pair of side-by-side openings 26 are formed in frame member 24. Openings 26 each include a center mount 28 supported by a plurality of ribs 30. A louver member 12 is mounted adjacent each opening 26, FIG. 3. Mounting may be accomplished as easily as adhering hub 16 to the center mount 28, FIG. 4. In this manner, FIGS. 2, 3 and 4, air flow generated movement of flaps 14 in direction D1, away from opening 26, also displaces a peripheral portion 14b of each flap 14 away from a peripheral portion 26a of each opening 26. A lack of air flow acting on flaps 14, permits flaps 14 to return to the natural state and flex in the direction D2, into closed position C wherein the peripheral portion 14b of each flap 14 engages the peripheral portion 26a of opening 26, thus blocking the opening 26 to the passage of reverse air flow designated RAF therethrough. It can be seen therefore, that louver member 12 functions as a one-way check valve.

Figure 5:
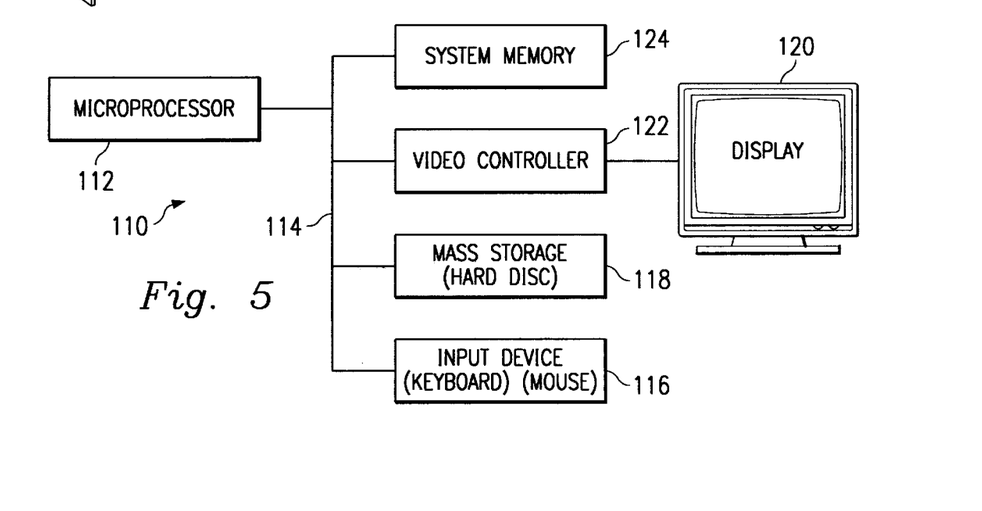
FIG. 5 is a diagrammatic view illustrating an embodiment of a computer system.

In one embodiment, computer system 110, FIG. 5, includes a microprocessor 112, which is connected to a bus 114. Bus 114 serves as a connection between microprocessor 112 and other components of computer system 110. An input device 116 is coupled to microprocessor 112 to provide input to microprocessor 112. Examples of input devices include keyboards, touchscreens, and pointing devices such as mouses, trackballs and trackpads. Programs and data are stored on a mass storage device 118, which is coupled to microprocessor 112. Mass storage devices include such devices as hard disks, optical disks, magneto-optical drives, floppy drives and the like. Computer system 110 further includes a display 120, which is coupled to microprocessor 112 by a video controller 122. A system memory 124 is coupled to microprocessor 112 to provide the microprocessor with fast storage to facilitate execution of computer programs by microprocessor 112. It should be understood that other busses and intermediate circuits can be deployed between the components described above and microprocessor 112 to facilitate interconnection between the components and the microprocessor.

Figure 6:
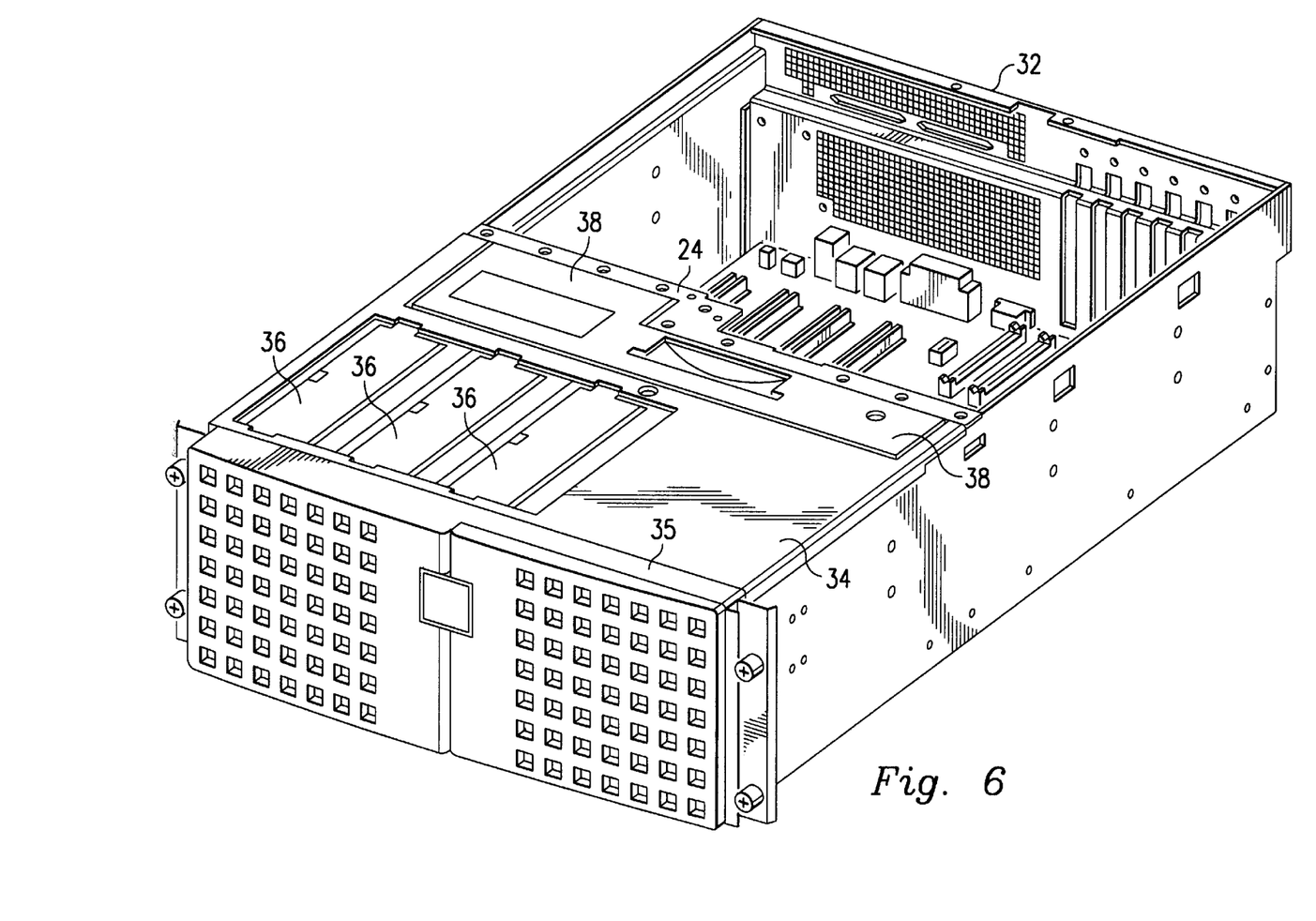
FIG. 6 is an isometric view illustrating an embodiment of a computer chassis.

In FIG. 6, a chassis 32 contains portions of computer system 110. A portion 35 of chassis 32 is occupied by one or more power supplies 36 and an adjacent portion 34 of chassis 32 is occupied by several hard disk drive units (not shown). A substantial amount of heat is generated by the operation of the power supplies 36 in portion 35 and by the hard disk drives in portion 34. Therefore, a fan module 38 is mounted adjacent portions 34 and 35. Also, the frame member 24 is mounted adjacent the fan module 38, see also FIG. 7. Fan module 38 includes a pair of serially mounted redundant fans 41, only one of which is visible in FIG. 7, and a pair of side-by-side redundant fans 20, as described above, also illustrated in FIGS. 1 and 2.

Figure 7:
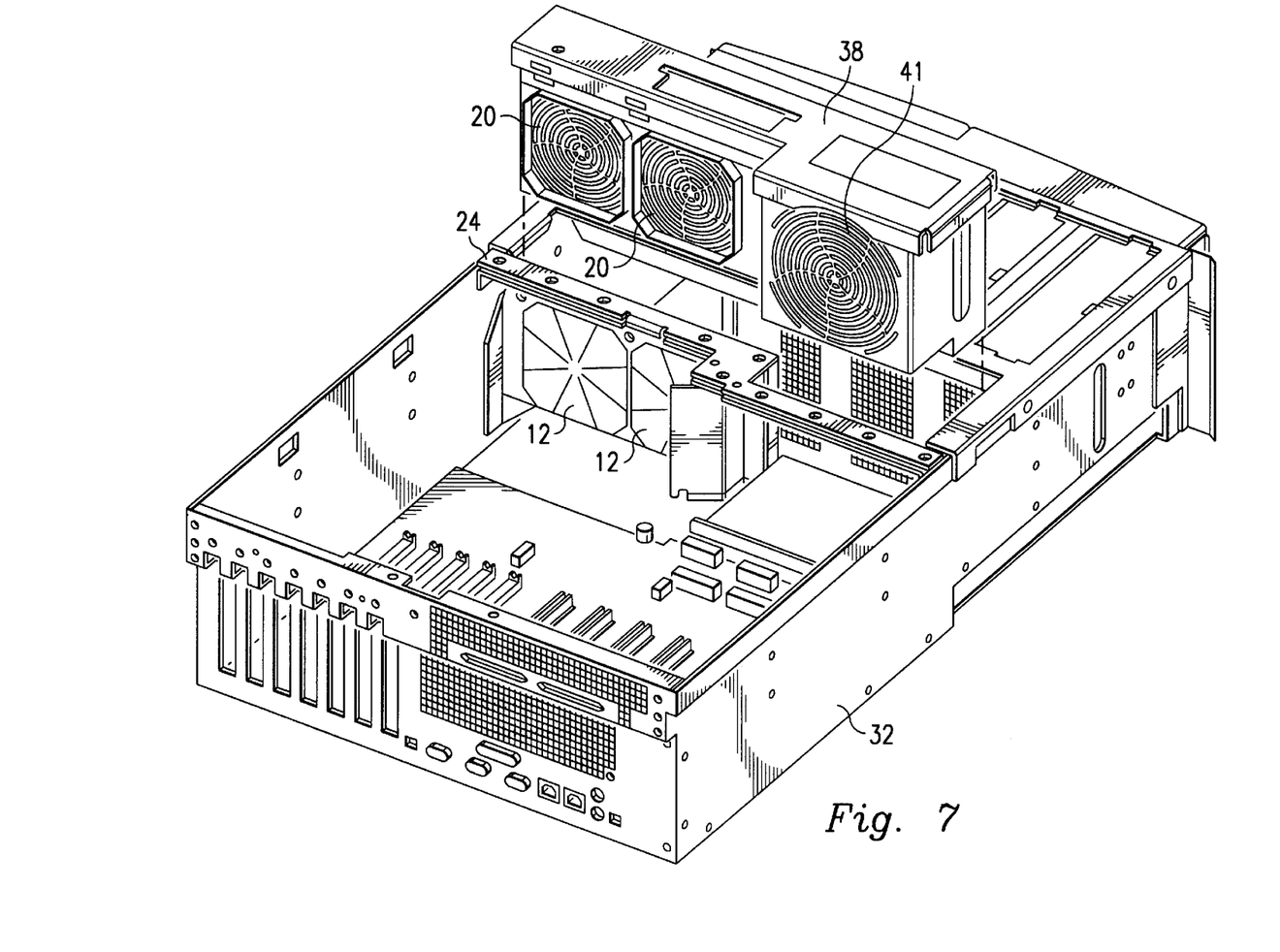
FIG. 7 is an isometric view illustrating an embodiment of a computer chassis, reversed from FIG. 6, and illustrating a fan module removed from the chassis.
Figure 8:
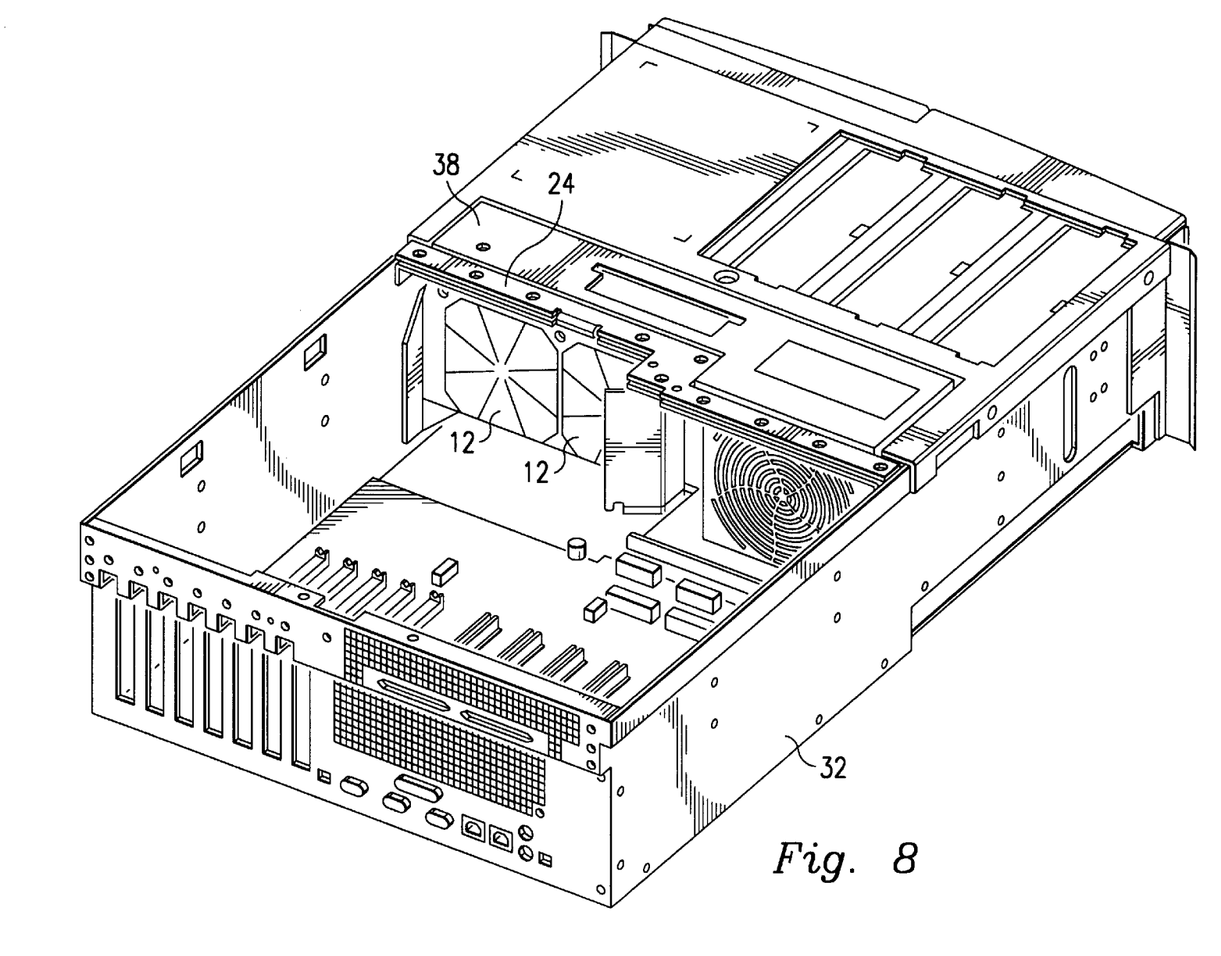
FIG. 8 is an isometric view illustrating an embodiment of a computer chassis including an installed fan module.
Figure 9:
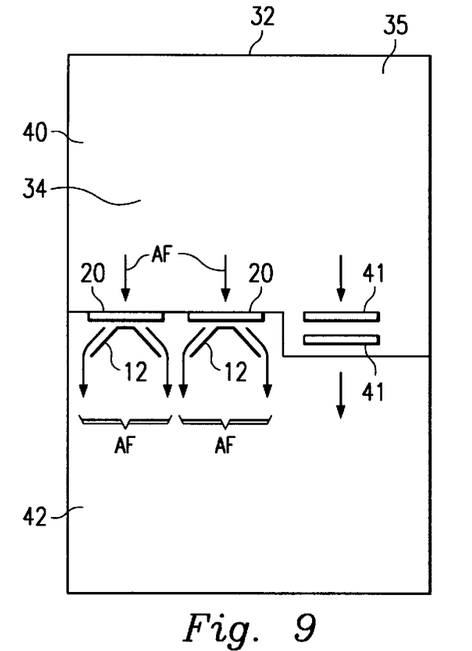
FIG. 9 is a diagrammatic view illustrating an embodiment of fans and louver members mounted in a computer chassis.
Figure 10:
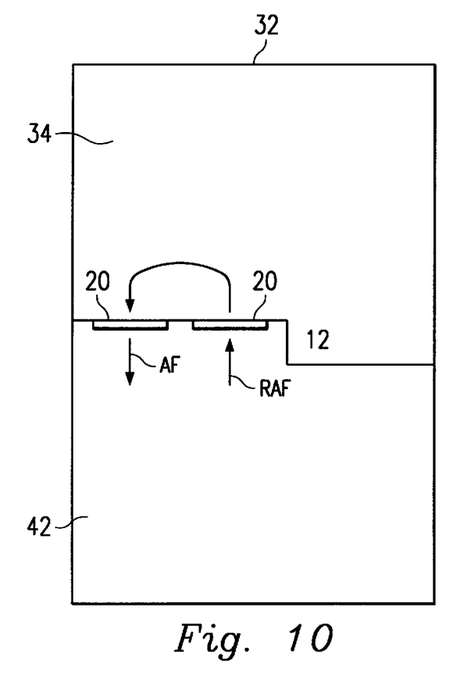
FIG. 10 is a diagrammatic view illustrating an embodiment of an operating fan and a failed fan in a computer chassis.
Figure 11:
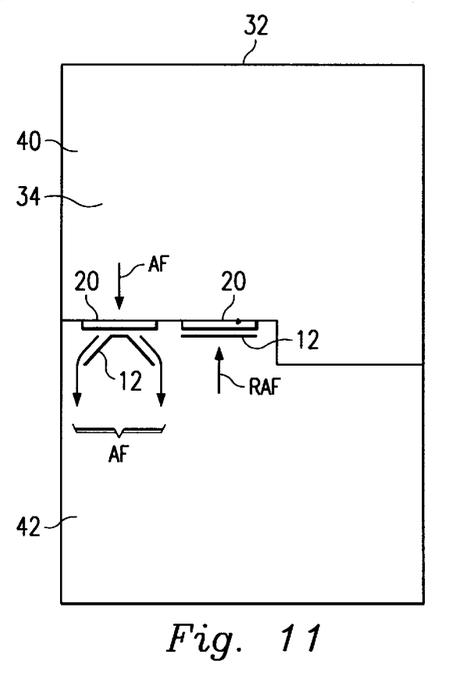
FIG. 11 a diagrammatic view illustrating an embodiment of an operating fan and a failed fan in a computer chassis with louver members.

When fan module 38 is mounted in chassis 32, FIG. 8, and frame member 24 is mounted adjacent to fan module 38, louver members 12 are positioned adjacent fans 20, see FIGS. 7 and 8. When fans 20 are operational, FIGS. 9, 10 and 11, side-by-side columns of air flow AF are directed from a low pressure side 40 of chassis 32 to a high pressure side 42 of chassis 32. Air flow AF draws air across portion 34 of chassis 32. In addition, a single column of air is drawn across portion 35 by serially mounted fans 41. More particularly, should one of the fans 20 fail, and the other of the fans 20 continue to operate, louver member 12 automatically closes its adjacent opening 26 adjacent the failed fan 20, as described above. This is diagrammatically illustrated in FIGS. 9, 10 and 11. In FIG. 9, side-by-side fans 20 are operational and air flows across side-by-side louver members 12 from the low pressure side 40 of chassis 32 to the high pressure side 42 for cooling portion 34 as designated at AF. In the event that one of the fans 20 should fail, and in the absence of louver members 12, FIG. 10, air from the high pressure side 42 would reverse flow to low pressure side 40, as designated at RAF, through the failed fan 20 and short circuit the portion 34 of chassis 32. As a result, a potential for power supply overheating in portion 34 of chassis 32 would exist. However, due to the presence of the above-described louver members 12 adjacent the fans 20, FIG. 11, the pressure differential between high pressure side 42 and low pressure side 40, will automatically close the louver member 12 adjacent the failed fan 20, to block reverse air flow RAF and permit air flow AF to continue to flow across the portion 34 via the remaining operational fan 20 and across the louver member 12 adjacent thereto, thus avoiding the air short circuit as described above and illustrated in FIG. 10.

Another advantage of this embodiment is that it may be constructed of die cut material to be more cost effective than previous devices, and requires no mounting structure other than the center of the fan housing. The louver member can be mounted in many ways, the most cost effective being adhesively mounted to either the fan housing or to an adjacent frame member. The louver member has a low profile and requires little space which is advantageous due to the density requirements of computer chassis.

The louver member is directed toward providing a passive one-way check valve mounted adjacent a cooling fan for the purpose of redundantly cooling an electronics enclosure such as a computer system chassis. The louver member will minimally impede the flow of air created by the fan during normal operation due to the structural and functional features of the extremely thin plastic louver member.

As a result, one embodiment provides a flow limiting apparatus including a flexible louver member including a plurality of flaps which are separately movable. The flaps are formed in the flexible member, and a portion of the flexible member provides a common interconnection for the flaps.

Another embodiment provides a flow limiting apparatus for a failed fan including a plurality of parallel fans mounted for moving side-by-side columns of air in a chassis. A louver member is mounted adjacent each fan. Each louver member is bendable in a first direction by a flow of air generated by its respective fan. The louver member is limited for partial movement in a second direction, opposite the first direction, in response to failure of its respective fan.

Another embodiment provides a computer system including a chassis and a plurality of fans mounted for moving side-by-side columns of air in the chassis. A louver member is mounted adjacent each fan and is bendable from a closed position to an open position by a flow of air generated by its respective fan. The louver member is also bendable to the closed position in response to failure of its respective fan.

A further embodiment provides a method of cooling including mounting a plurality of fans in a chassis for moving side-by-side columns of air. Louver members are formed to include a plurality of deformable flaps extending radially from a hub. A louver member is mounted in an opening adjacent each fan for movement of the flaps between an open position and a closed position. The flaps are deformed to the open position in response to operation of its respective fan. The flaps are restrictedly flexed to the closed position into engagement with a portion of the opening in response to failure of its respective fan.

As it can be seen, the principal advantages of these embodiments are that they are lightweight, inexpensive sheets of thin polymer material which are cut to form flexible flaps therein. The flaps are bendable and deformable in response to air flow thereacross. The louver member is easily installed and/or replaced and functions as a passive one-way check valve to limit an air short circuit when one of a plurality of parallel cooling fans fails as the other fan or fans continue to operate.

Although illustrative embodiments have been shown and described, a wide range of modification, change and substitution is contemplated in the foregoing disclosure and in some instances, some features of the embodiments may be employed without the corresponding use of other features. Accordingly, it is appropriate that the appended claims be construed broadly and in a manner consistent with the scope of the embodiments disclosed herein.

What is claimed is:

1. A flow limiting apparatus for a failed fan comprising:
   a plurality of parallel fans mounted for moving side-by-side columns of air in a chassis;
   a frame mounted adjacent each fan, the frame including a plurality of side-by-side openings formed therein, each opening aligned with a respective fan and including a center mount supported therein by the frame; and
   a plurality of louver members, one louver member mounted adjacent each opening, each louver member including a hub and a plurality of flexible flaps each including a narrow portion and extending radially from the hub, each hub being attached directly to the center mount of its respective opening, whereby each flap is bendable at the narrow portion in a first direction to overlap with each adjacent flap due to a flow of air generated by its respective fan, and limited for partial movement in a second direction, opposite the first direction, in response to failure of its respective fan.

2. The apparatus as defined in claim 1 wherein each hub is adhered to its respective center mount.

3. The apparatus as defined in claim 1 wherein movement of each louver member in the second direction is limited by the frame of its respective opening, whereby the louver member blocks air flow therethrough.

4. The apparatus of claim 2 wherein each flap is flexible for permitting bending adjacent the hub in response to air flow thereacross.

5. A computer system comprising:
   a chassis having a first portion and a second portion therein;
   a plurality of parallel fans mounted for moving side-by-side columns of air in the chassis from the first portion to the second portion;
   a frame mounted adjacent each fan, the frame including a plurality of side-by-side openings formed therein, each opening aligned with a respective fan and including a center mount attached to the frame; and
   a plurality of louver members, one louver member mounted adjacent each opening, each louver member including a hub and a plurality of flexible flaps each including a narrow portion and extending radially from the hub, each hub being attached directly to the center mount of its respective opening, whereby each flap is bendable at the narrow portion from a closed position to an open position to overlap with each adjacent flap due to a flow of air generated by its respective fan, and bendable to the closed position in response to failure of its respective fan.

6. The system as defined in claim 5 wherein each hub is adhered to its respective center mount.

7. The system as defined in claim 6 wherein each flap is bendable adjacent the hub.

8. The system as defined in claim 5 wherein movement of each louver member to the closed position is limited by a frame of its respective opening, whereby the louver member blocks air flow therethrough.

9. A computer system comprising:

a chassis;

at least one microprocessor mounted in the chassis;

at least one input coupled to provide input to the microprocessor;

a least one storage coupled to the microprocessor;

at least one display coupled to the microprocessor by a video controller;

at least one memory coupled to provide storage to facilitate execution of computer programs by the microprocessor;

a plurality of parallel fans mounted for moving side-by-side columns of air in the chassis;

a frame mounted adjacent each fan, the frame including a plurality of side-by-side openings formed therein, each opening aligned with a respective fan and including a center mount supported therein by a plurality of ribs; and a plurality of louver members, one louver member mounted adjacent each openings, each louver member including a hub and a plurality of flexible flaps each including a narrow portion and extending radially from the hub, each hub being attached directly to the center mount of its respective opening, whereby each flap is bendable at the narrow portion from a closed position to an open position to overlap with each adjacent flap due to a flow of air generated by its respective fan, and bendable to the closed position in response to failure of its respective fan.

10. The system as defined in claim 9 wherein each hub is adhered to its respective center mount.

11. The system as defined in claim 7 wherein each flap is bendable adjacent the hub.

12. The system as defined in claim 9 wherein movement of each louver member to the closed position bends the flaps into engagement with the frame portion defining the opening.

13. A method of cooling comprising the steps of:

mounting a plurality of fans in a chassis for moving side-by-side columns of air;

forming louver members to each include a plurality of deformable flaps each flap having a narrow portion and extending radially from a hub;

forming a frame including a plurality of side-by-side openings therein, each opening including a center mount supported therein by the frame;

mounting the frame in the chassis adjacent the fans so that each opening is aligned with a respective fan;

mounting a louver member in each opening adjacent each fan so that each hub is attached directly to a respective center mount for movement of the flaps between an open position and a closed position;

deforming the flaps at the narrow portion of the louver member to the open position to overlap with each adjacent flap in response to operation of its respective fan; and restrictive flexing the flaps of the louver member to the closed position into engagement with a portion of the opening in response to failure of its respective fan.

14. A flow limiting apparatus comprising:

a frame including a plurality of side-by-side openings formed therein, each opening including a peripheral edge, and a center mount supported therein by a plurality of ribs;

a flexible louver member mounted adjacent each opening, each louver member including a hub and a plurality of flexible flaps each including a narrow portion and extending radially to a peripheral portion distal from the hub, each hub being attached directly to the center mount of its respective opening; and the peripheral portion of each flap being movable to overlap with each adjacent flap in response to fan generated air flowing across the louver member.

15. The apparatus as defined in claim 14 wherein the flaps are bendable adjacent the hub.

16. The apparatus as defined in claim 14 wherein the flaps are formed by cuts in the flexible member.

* * * * *

UNITED STATES PATENT AND TRADEMARK OFFICE
CERTIFICATE OF CORRECTION

PATENT NO. : 6,031,717
DATED : February 29, 2000
INVENTOR(S) : Baddour et al.

Page 1 of 1

It is certified that error appears in the above-identified patent and that said Letters Patent is hereby corrected as shown below:

<u>Column 7,</u>
Line 40, After "claim", delete "7" and insert -- 9 --.

Signed and Sealed this

Twenty-eighth Day of May, 2002

Attest:

JAMES E. ROGAN
*Attesting Officer*     *Director of the United States Patent and Trademark Office*